(12) United States Patent
Thangam

(10) Patent No.: US 10,713,154 B2
(45) Date of Patent: Jul. 14, 2020

(54) SMART TEMPLATE TEST FRAMEWORK

(71) Applicant: SAP SE, Walldorf (DE)

(72) Inventor: Sathiyanarayanan Thangam, Tirunelveli (IN)

(73) Assignee: SAP SE, Walldorf (DE)

( * ) Notice: Subject to any disclaimer, the term of this patent is extended or adjusted under 35 U.S.C. 154(b) by 67 days.

(21) Appl. No.: 16/181,134

(22) Filed: Nov. 5, 2018

(65) Prior Publication Data
US 2020/0142817 A1 May 7, 2020

(51) Int. Cl.
*G06F 9/44* (2018.01)
*G06F 11/36* (2006.01)

(52) U.S. Cl.
CPC ...... *G06F 11/3688* (2013.01); *G06F 11/3664* (2013.01); *G06F 11/3676* (2013.01)

(58) Field of Classification Search
None
See application file for complete search history.

(56) References Cited

U.S. PATENT DOCUMENTS

| | | | |
|---|---|---|---|
| 7,761,841 B1 * | 7/2010 | Rexroad | G06F 11/3688 |
| | | | 717/125 |
| 8,819,488 B1 * | 8/2014 | Arguelles | G06F 11/2635 |
| | | | 714/25 |
| 2009/0177669 A1 * | 7/2009 | Ramarao | G06F 40/14 |

* cited by examiner

*Primary Examiner* — Qamrun Nahar
(74) *Attorney, Agent, or Firm* — Jones Day

(57) ABSTRACT

Data is received that characterizes graphical user interface elements of a software application. Thereafter, labels within the received data are identified. Further, those labels having corresponding input fields are identified. These identified input fields are used to poll a test data repository for test data appropriate for such input fields. Using the test data obtained as part of the polling, a testing script for the software application is executed which injects the test data into the identified input fields. Related apparatus, systems, techniques and articles are also described.

20 Claims, 7 Drawing Sheets

SMART TEMPLATE TEST FRAMEWORK

TECHNICAL FIELD

The subject matter described herein relates to a framework for testing software applications which are of similar view/layout/template.

BACKGROUND

Software development practices change over time, so do the tools and technologies. Such changes aim to improve productivity, quality, customer satisfaction, to tackle ever-shorten delivery time, and to deliver successful products and services. One of the core requirements is higher automated testing. Even manual testers would soon have to take on automated testing in possible areas of their operations. Automated testing is an important enabler for the rapid transfer of a software update from a development to being deployed. However, automatic test scripts are brittle to small changes in the application under test or the test environment. This factor causes automatic testing to be unreliable and high maintenance.

SUMMARY

In one aspect, data is received that characterizes graphical user interface elements of a software application. Thereafter, labels within the received data are identified. Further, those labels having corresponding input fields are identified. These identified input fields are used to poll a test data repository for test data appropriate for such input fields. Using the test data obtained as part of the polling, a testing script for the software application is executed which injects the test data into the identified input fields.

Identifying the labels can include capturing the labels using their respective tag names. In addition or in the alternative, identifying the labels can include capturing the labels using their respective xpaths.

The software application can be generated using one of a plurality of application templates such that applications generated using such template differ in number of input fields, tables, and tabs. With such arrangement, a determination can be made as to which of the application templates was used to generate the software application. Applications generated using such template have the same transition between graphical user interface screens.

The received data can include a document object model for the software application.

The testing script can execute functional testing and/or regression testing. Further, a report can be generated and provided (e.g., displayed, stored, loaded into memory, transmitted to a remote computer, etc.) that characterizes the results of the testing script.

In an interrelated aspect, data is received that characterizes graphical user interface elements of a software application. Tables used within screens of a software application are then identified. Based on such identification, column names within the tables are identified and are subsequently used to poll a test data repository for test data appropriate for such column names. A testing script is later executed for the software application that injects the test data into the tables for testing purposes.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides change-accommodative and robust testing frameworks that provide reduced maintenance costs and consistent performance while also being highly adaptive. In particular, the current subject matter reduces efforts required for creating new test scripts and for maintaining older scripts. Further, the current subject matter allows for advanced testing without requiring that the user have any specific programming knowledge.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to an enhanced graphical user interface test framework. In particular, the current subject matter can be useful for application in which graphical user interface elements are different across different applications, but the underlying layout remains the same or substantially the same (such as with SAP FIORI Applications).

The current subject matter can be characterized as providing a smart adaptive test framework which allows for the reuse of test scripts irrespective of underlying uniform resource locators (URLs) and/or user interface elements (UI elements). Test scripts, in this regard, can execute a variety of functions such as functional testing, regression testing etc.

Figure 1:
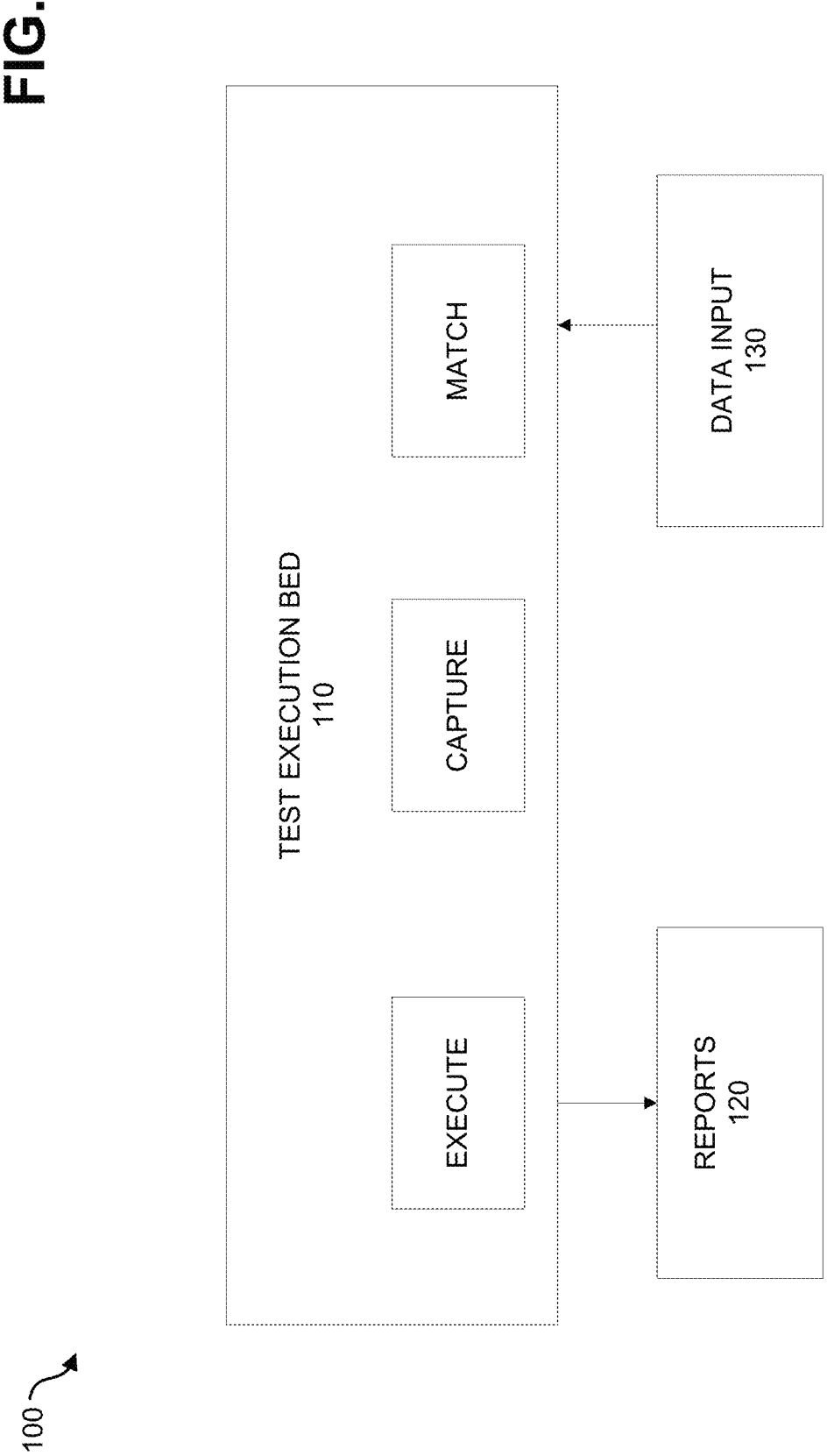
FIG. 1 is a logic diagram illustrating a software application adaptive test framework.

FIG. 1 is a diagram 100 illustrating a test framework that includes various modules such as test execution bed 110, reports 120, and a data input 130. The test execution bed 110 captures UI elements, matching with the data inputs and execution of the scripts will be done. The data input 130 provides an interface to receive test data. The test data can take various forms for example, an EXCEL spreadsheet, XML file, or other formats. The reports 120 can include detailed execution logs which characterize the results of the tests.

Applications that can be tested using the test framework can include three general functionalities: create, display, and edit. A user, via a graphical user interface of the test framework, can specify one or more of these functionalities for testing purposes.

Figure 2:
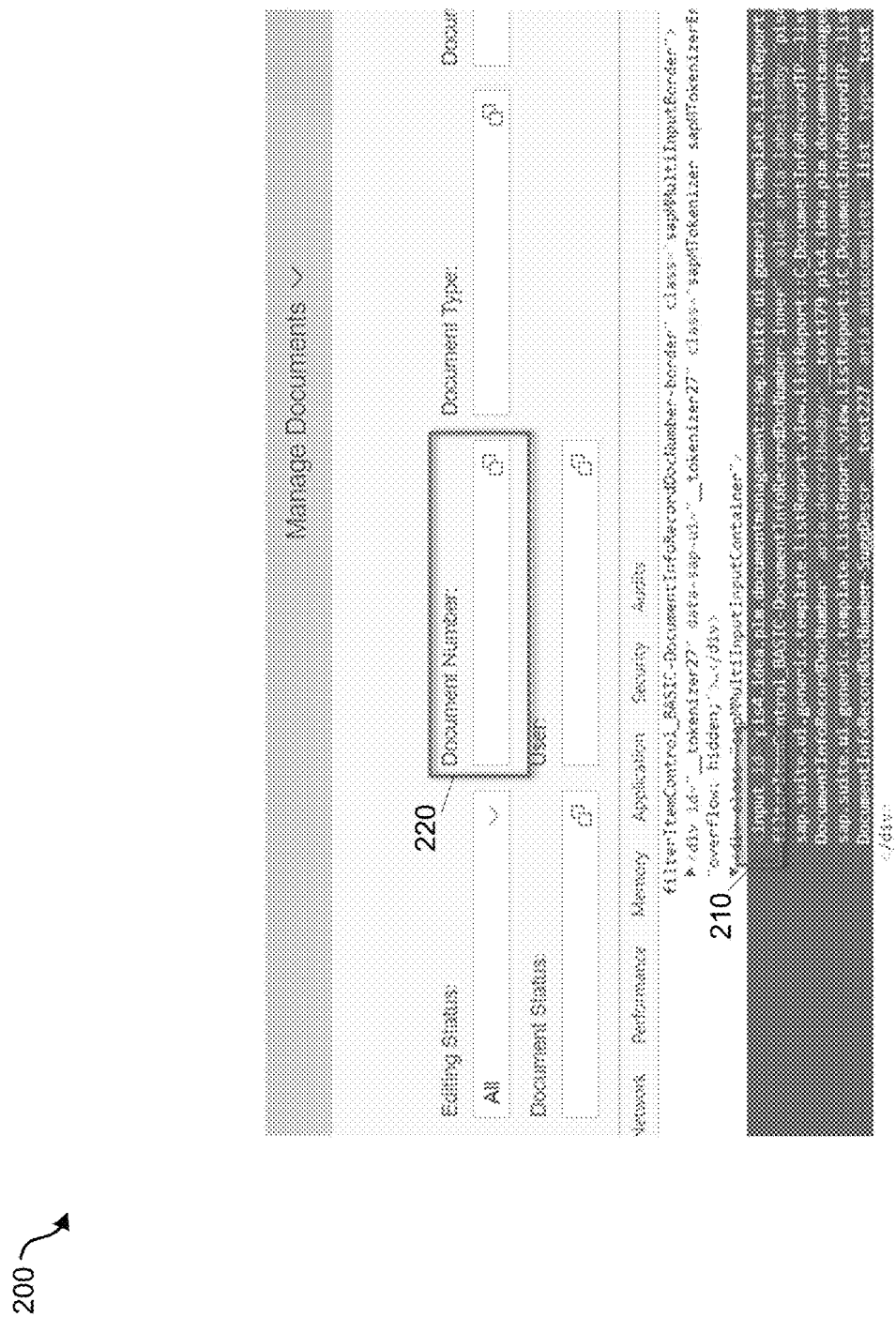
FIG. 2 is a first view of a graphical user interface of an application.

UI elements of the applications can have specific tag names based on the behavior of the element. These tag names can be common across different Hypertext Markup Language (HTML) versions of the applications. For example: Tag name <input> is for text box; Tag name <button> is for a button. FIG. 2 is a sample view 200 of a graphical user interface in which there is an HTML tag <input> 210 for a text input box 220.

All text boxes present within the HTML DOM (Document Object Model) can be captured using tag name or xpath. The text boxes (input fields) will be captured in runtime and based on the captured text boxes, inputs will be passed to the application and application will be tested based on the functionality picked.

Detailed reports can be generated based on the outcome of the execution. These reports can specify captured element's value, errors or warning if occurred etc.

Figure 3:
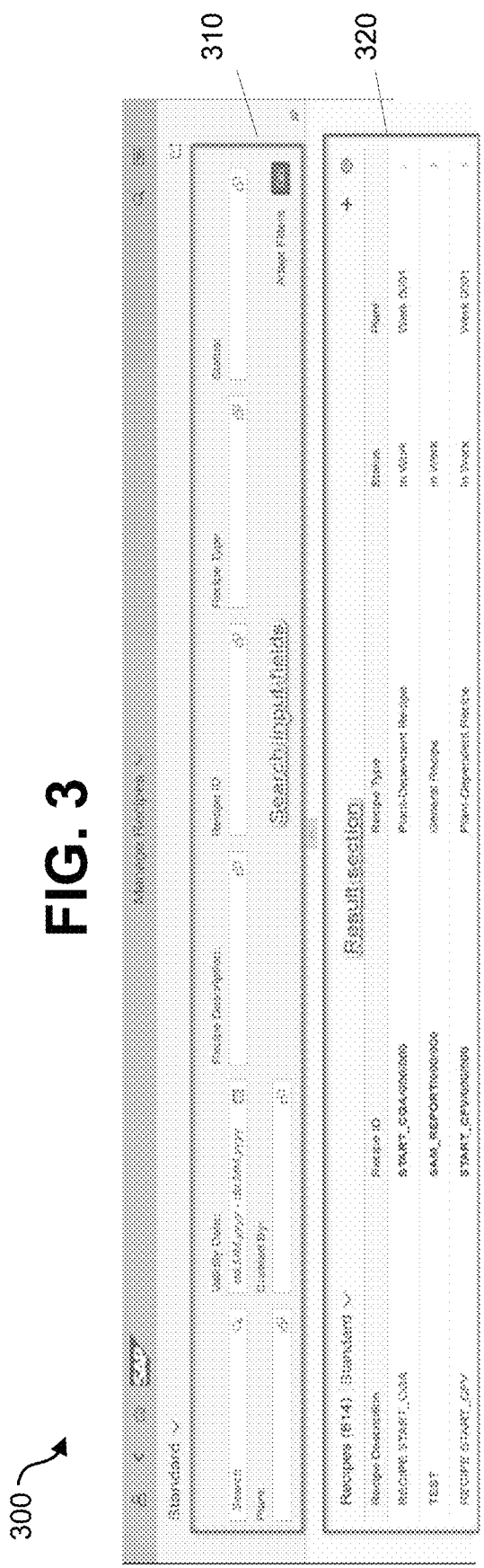
FIG. 3 is a second view of a graphical user interface of an application.
Figure 4:
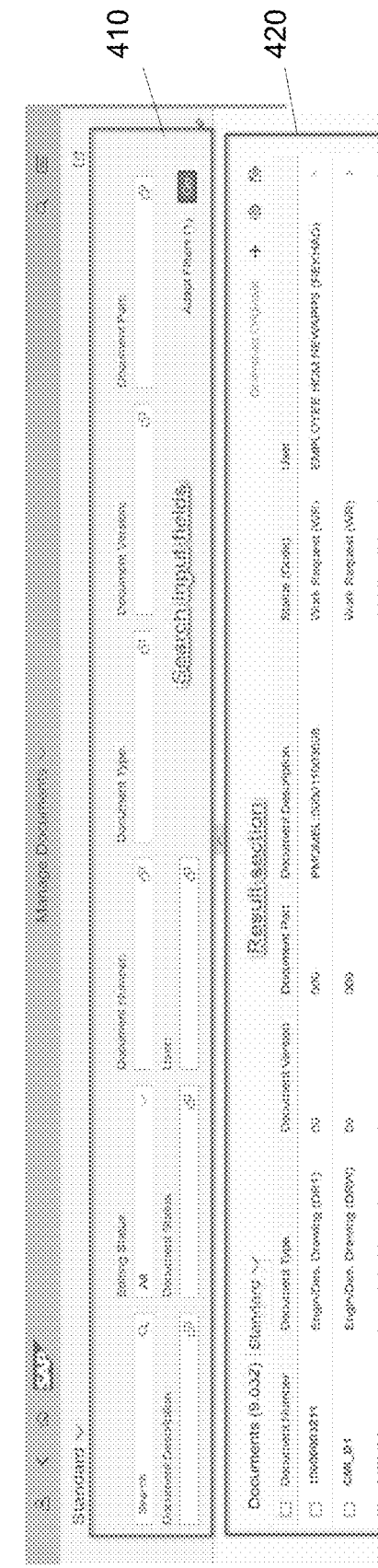
FIG. 4 is a third view of a graphical user interface of an application.

With reference to graphical user interface views 300, 400 of FIGS. 3-4, an application focusing on searching can include search input fields 310, 410 comprising text input boxes, menus and/or other graphical user interface elements to specify search parameters and a result section 320, 420. While the first view 300 relates to management of recipes, the second view 400 relates to document management purposes, these applications present data in a similar format with values for fields and columns differing.

With the current subject matter, one template testing script or automate can be created for each application template (e.g., SAP FIORI application template, etc.). Applications which uses a template differs only in number of input fields, tables, tabs, etc. but the screen and transition between screens remains the same. Therefore, as with the current subject matter, automating the template testing script to handle fields dynamically can allow for such testing script to be used for other applications utilizing the same or a similar application template.

Figure 5:
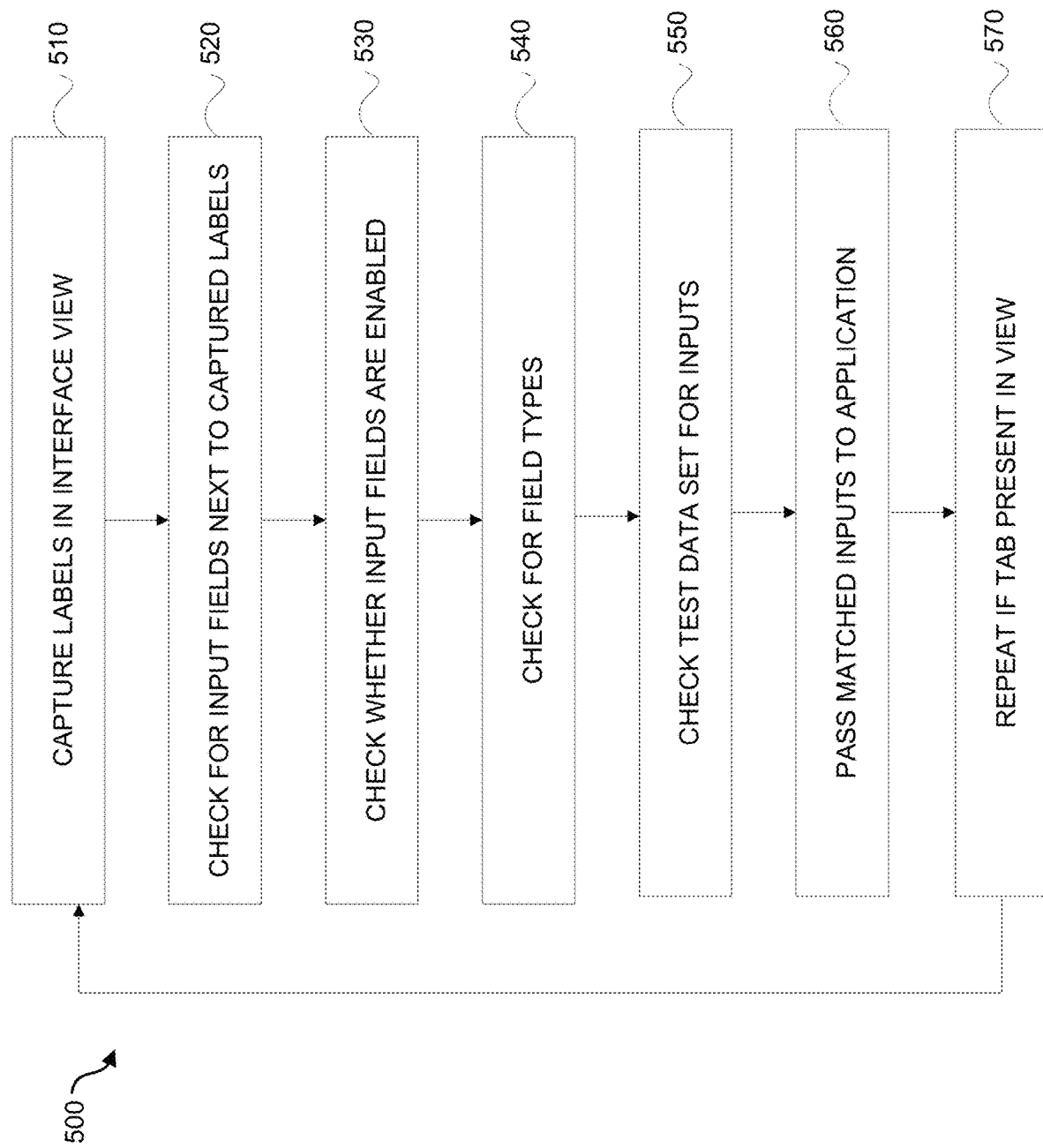
FIG. 5 is a process flow diagram illustrating dynamically finding input fields in an application view and inserting values into such fields for testing purposes.

FIG. 5 is a process flow diagram 500 for dynamically finding input fields and for inserting values into such fields in an application as part of a test (to be conducted by a testing script). Initially, at 510, all labels in the screen are captured. For example, Xpath: "//label" to capture the labels in the screen. Thereafter, at 520, whether the input fields are present next to the captured labels can be checked. If previous checks are passed, then it can be checked, at 530, whether the field is enabled (i.e., the GUI field is active). Next, at 540, for those fields which are enabled (i.e., active, etc.) types are checked such as textbox, drop down menu, etc. Whether the input field is present in the test data repository is then checked, at 550. If a match is found between captured input fields in test data repository then, at 560, the matched input values are passed to the application. Further, at 570, the process can be repeated from 510 if tabs are present in the view being analyzed.

Figure 6:
FIG. 6 is a process flow diagram illustrating dynamically finding input tables in an application view and inserting values into such tables for testing purposes.

FIG. 6 is a process flow diagram 600 for dynamically finding tables and inserting values into such tables used by an application as part of a test to be conducted. Initially, at 610, all tables present in a particular interface view are identified (using their tag and/or label). For example, Xpath: "//tbody" to capture the label of tables in the screen. Thereafter, at 620, column names present inside the table(s) can be obtained. Next, at 630, test data repository is then checked. If a match is found between captured column names in the test data repository then, at 640, the input values are passed to the application. If there are tabs present in the screen, then, at 650, the process can be repeated from 610.

Figure 7:
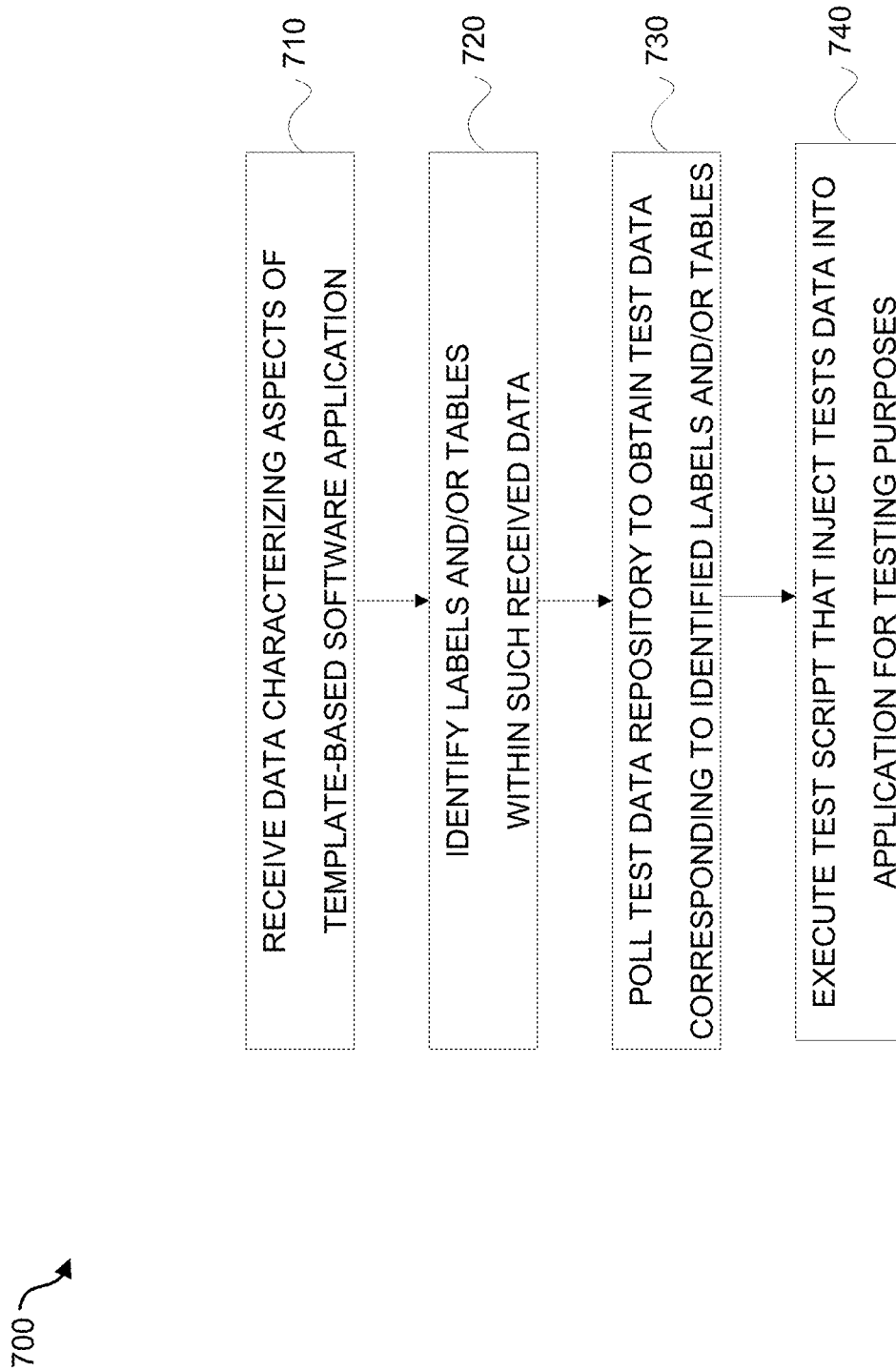
FIG. 7 is a process flow diagram illustrating the identification of relevant test data for a template-based software application and the execution of a test script using such test data.

FIG. 7 is a process flow diagram 700 in which, at 710, data is received that characterizes aspects of a template-based software application. Such data can include, for example, code or other information that specifies or otherwise characterizes various graphical user interface elements (e.g., input fields, tables, menus, tabs, etc.) that are used in screens of the application. Labels, tables and/or other information characterizing the graphical user interface elements are, at 720, then identified. Such identified information is used, at 730, to poll a test data repository to obtain relevant test data for this particular template-based software application. Using such test data, at 740, a test script can be executed that injects the test data into the template-based software application. Injecting, as used herein, can refer to the test data being used to mimic user interaction with the graphical user interface of the software application in order to assess or otherwise characterize performance of the software application.

Figure 8:
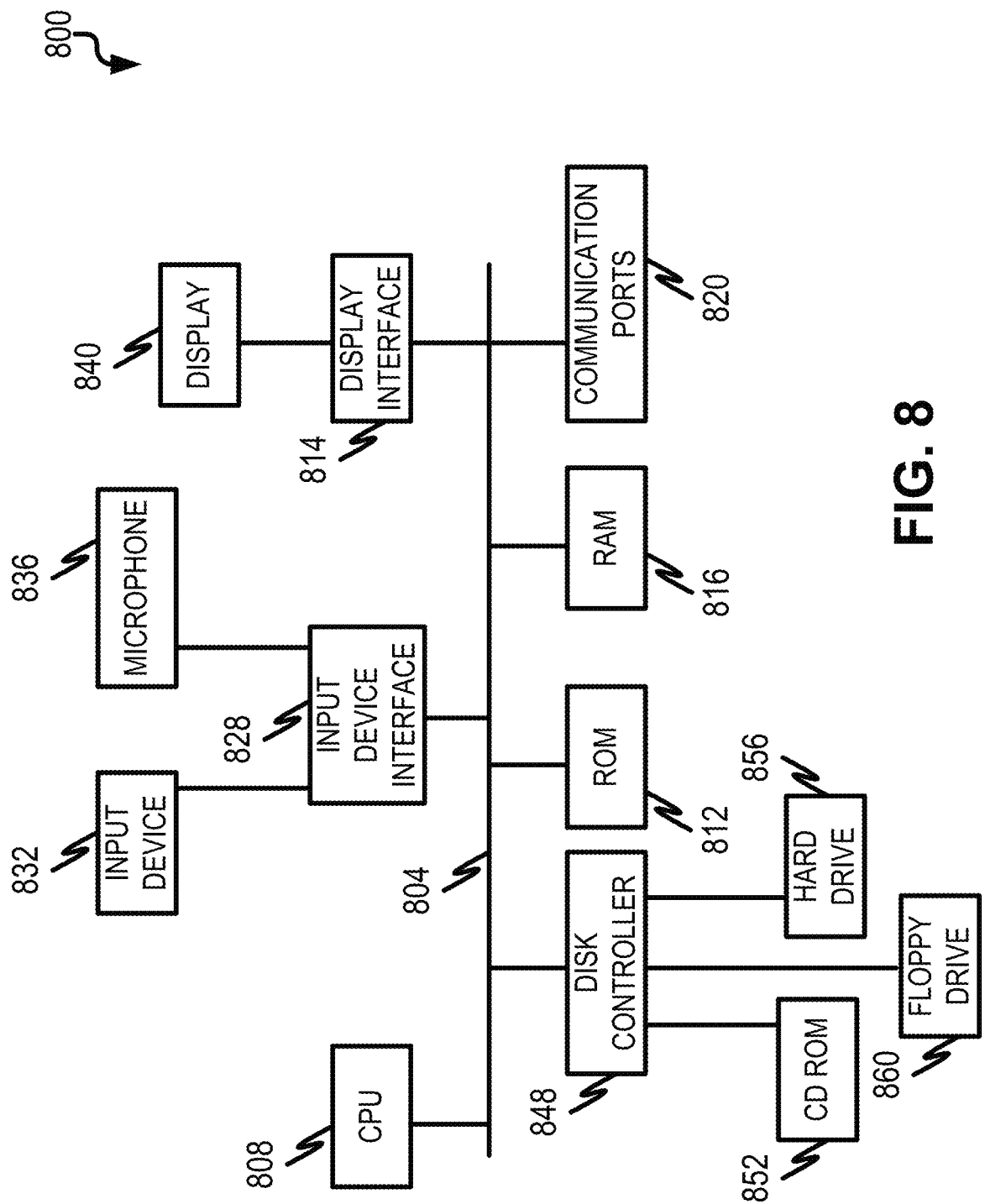
FIG. 8 is a diagram illustrating a computing device for implementing aspects described and/or illustrated herein.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface one or more optional disk drives to the system bus 804. These disk drives can be external or internal floppy disk drives such as 860, external or internal CD-ROM, CD-R, CD-RW or DVD, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the communication port 820 includes or otherwise comprises a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. The input device 832 and the microphone 836 can be coupled to and convey information via the bus 804 by way of an input device interface 828. Other computing devices, such as dedicated servers, can omit one or more of the display 840 and display interface 814, the input device 832, the microphone 836, and input device interface 828.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data characterizing graphical user interface elements of a software application;
   identifying labels within the received data;
   identifying which of the labels have corresponding input fields;
   determining which of a plurality of application templates was used to generate the software application, wherein applications generated using a same template differ in number of input fields, tables, and tabs;
   polling, using the identified input fields, a test data repository for test data appropriate for such input fields; and
   executing a testing script for the software application that corresponds to the determined application template using the test data, the testing script injecting the test data into the identified input fields.

2. The method of claim 1, wherein identifying the labels comprises:
capturing the labels using their respective tag names.

3. The method of claim 1, wherein identifying the labels comprises:
capturing the labels using their respective xpaths.

4. The method of claim 1, wherein applications generated using such template have the same transition between graphical user interface screens.

5. The method of claim 1, wherein the received data comprises a document object model for the software application.

6. The method of claim 1, wherein the testing script executes functional testing and/or regression testing.

7. The method of claim 1 further comprising:
generating and providing a report characterizing results of the testing script.

8. A computer-implemented method comprising:
receiving data characterizing graphical user interface elements of a software application;
identifying, for each screen of the software application, tables used within such screens;
identifying column names within the tables;
determining which of a plurality of application templates was used to generate the software application, wherein applications generated using a same template differ in number of input fields, tables, and tabs;
polling, using the identified input fields, a test data repository for test data appropriate for such input fields; and
executing a testing script for the software application that corresponds to the determined application template using the test data, the testing script injecting the test data into the identified input fields.

9. The method of claim 8, wherein identifying the tables comprises:
capturing the tables using their respective tag names.

10. The method of claim 8, wherein identifying the tables comprises:
capturing the tables using their respective xpaths.

11. The method of claim 8, wherein applications generated using such template have the same transition between graphical user interface screens.

12. The method of claim 8, wherein the received data comprises a document object model for the software application.

13. The method of claim 8, wherein the testing script executes functional testing and/or regression testing.

14. The method of claim 8 further comprising:
generating and providing a report characterizing results of the testing script.

15. A system comprising:
at least one data processor; and
memory storing instructions which, when executed by the at least one data processor, result in operations comprising:
receiving data characterizing graphical user interface elements of a software application;
identifying labels within the received data;
identifying which of the labels have corresponding input fields;
determining which of a plurality of application templates was used to generate the software application, wherein applications generated using a same template differ in number of input fields, tables, and tabs;
polling, using the identified input fields, a test data repository for test data appropriate for such input fields; and
executing a testing script for the software application that corresponds to the determined application template using the test data, the testing script injecting the test data into the identified input fields.

16. The system of claim 15, wherein identifying the labels comprises:
capturing the labels using their respective tag names and/or their respective xpaths.

17. The system of claim 15, wherein the operations further comprise:
generating and providing a report characterizing results of the testing script.

18. The system of claim 15, wherein applications generated using such template have the same transition between graphical user interface screens.

19. The system of claim 15, wherein the received data comprises a document object model for the software application.

20. The system of claim 15, wherein the testing script executes functional testing and/or regression testing.

* * * * *